US012759461B2

(12) United States Patent
Hamming et al.

(10) Patent No.: US 12,759,461 B2
(45) Date of Patent: Oct. 13, 2026

(54) ADJUSTING INSTRUMENT FOR AN EXTERIOR VISION UNIT FOR A VEHICLE

(71) Applicant: MCi (Mirror Controls International) Netherlands B.V., Woerden (NL)

(72) Inventors: Peter Alexander Hamming, Ermelo (NL); Sigrid Elizabeth Van Leeuwen, Herveld (NL)

(73) Assignee: MCi (Mirror Controls International) Netherlands B.V., Woerden (NL)

(*) Notice: Subject to any disclaimer, the term of this patent is extended or adjusted under 35 U.S.C. 154(b) by 603 days.

(21) Appl. No.: 17/926,784

(22) PCT Filed: May 26, 2021

(86) PCT No.: PCT/NL2021/050333

§ 371 (c)(1),
(2) Date: Nov. 21, 2022

(87) PCT Pub. No.: WO2021/242099

PCT Pub. Date: Dec. 2, 2021

(65) Prior Publication Data

US 2023/0202391 A1 Jun. 29, 2023

(30) Foreign Application Priority Data

May 26, 2020 (NL) ...................................... 2025682

(51) Int. Cl.
*B60R 1/07* (2006.01)
*B60R 1/28* (2022.01)

(52) U.S. Cl.
CPC .................. *B60R 1/07* (2013.01); *B60R 1/28* (2022.01); *B60R 2300/101* (2013.01)

(58) Field of Classification Search
CPC ........... B60R 1/07; B60R 1/072; B60R 1/074; B60R 1/28; B60R 2300/101
(Continued)

(56) References Cited

U.S. PATENT DOCUMENTS 6,130,514 A * 10/2000 Oesterholt .............. B60R 1/074 359/872
6,224,220 B1 * 5/2001 Duroux ................... B60R 1/074 359/872

(Continued)

FOREIGN PATENT DOCUMENTS

EP 0860323 A2 8/1998
EP 3524474 A1 8/2019

(Continued)

*Primary Examiner* — Jyotsna V Dabbi
(74) *Attorney, Agent, or Firm* — Volpe Koenig

(57) ABSTRACT

The invention relates to an adjusting instrument for an exterior vision unit for a vehicle, comprising a base shaft and a housing surrounding the base shaft which is pivotable around a longitudinal axis adjustment range between at least a park position and a drive position. The adjusting instrument further comprises a driving gearwheel, a gearwheel body, and a spring. The driving gearwheel includes a face provided with an outer toothing surrounding the base shaft, defining a face height within which a web part of the gearwheel body extends in a transverse plane with respect to the base shaft. The spring surrounds the base shaft and is supported on a support surface of the gearwheel body, exerting a force on the driving gearwheel along the longitudinal axis. The support surface lies recessed in an axial direction with respect to the transverse plane, such that the spring reaches through the transverse plane.

20 Claims, 3 Drawing Sheets

(58) Field of Classification Search
USPC .......................................... 359/841, 872, 877
See application file for complete search history.

(56) References Cited

U.S. PATENT DOCUMENTS

| | | | | |
|---|---|---|---|---|
| 7,008,067 | B2 * | 3/2006 | Hsu | B60R 1/074 359/877 |
| 7,104,660 | B2 * | 9/2006 | Sakata | B60R 1/074 359/872 |
| 8,129,642 | B2 * | 3/2012 | Brouwer | B60R 1/074 200/405 |
| 10,562,453 | B2 * | 2/2020 | van Stiphout | B60R 1/074 |
| 11,396,264 | B2 * | 7/2022 | Peterson | B60R 1/074 |
| 11,623,569 | B2 * | 4/2023 | Martin Pina | B60R 1/076 359/841 |
| 2004/0264015 | A1 * | 12/2004 | Hsu | B60R 1/074 359/877 |
| 2007/0029179 | A1 * | 2/2007 | Brouwer | B60R 1/074 200/329 |
| 2009/0303625 | A1 * | 12/2009 | van Stiphout | B60R 1/074 359/841 |
| 2011/0255188 | A1 * | 10/2011 | Watanabe | B60R 1/076 359/841 |
| 2014/0133044 | A1 * | 5/2014 | Mambourg | B60R 1/072 359/877 |
| 2018/0345862 | A1 * | 12/2018 | van Stiphout | B60R 1/074 |
| 2018/0345863 | A1 * | 12/2018 | Bouaziz | G02B 7/182 |
| 2019/0248291 | A1 * | 8/2019 | Mendoza Vicioso | B60R 1/0617 |
| 2022/0219608 | A1 * | 7/2022 | Hamming | B60R 1/074 |
| 2023/0078474 | A1 * | 3/2023 | Roose | F16H 1/16 359/841 |

FOREIGN PATENT DOCUMENTS

| | | | |
|---|---|---|---|
| JP | 863195041 | | 8/1988 |
| JP | S63284047 | | 11/1988 |
| JP | H07-117565 | A | 5/1995 |
| JP | 2012-111444 | A | 6/2012 |
| JP | 2016-37234 | A | 3/2016 |
| KR | 1019980071495 | | 10/1998 |
| KR | 20170057304 | A | 5/2017 |
| KR | 102090890 | B1 | 3/2020 |
| WO | 2019209106 | A1 | 10/2019 |

* cited by examiner

ADJUSTING INSTRUMENT FOR AN EXTERIOR VISION UNIT FOR A VEHICLE

CROSS REFERENCE TO RELATED APPLICATIONS

This application is a 35 USC § 371 National Stage application of International Patent Application No. PCT/NL2021/050333, which was filed May 26, 2021, entitled "ADJUSTING INSTRUMENT FOR AN EXTERIOR VISION UNIT FOR A VEHICLE" and claims priority to Netherlands Patent Application No. 2025682, filed May 26, 2020 and is incorporated herein by reference as if fully set forth.

The invention relates to an adjusting instrument for an exterior vision unit, such as an exterior mirror, exterior display and/or exterior camera, for a vehicle, in particular a motor vehicle.

An exterior vision unit, such as an exterior mirror, exterior display and/or exterior camera, is applied to vehicles, for example cars, and usually comprises a supporting frame for supporting an exterior vision element, for example a mirror or camera.

The adjusting instrument is connected with the supporting frame and is intended to adjust the supporting frame around a base shaft, to be coupled with the vehicle, of the adjusting instrument. The adjusting instrument usually comprises a housing which is pivotable relative to the base shaft in an adjustment range, typically between a park position and a drive position. In the park position, the supporting frame extends for instance substantially along the vehicle, and in the case of an exterior mirror unit with a mirror side facing the vehicle. In the drive position, the supporting frame extends for instance substantially transversely to the vehicle, and in the case of an exterior mirror unit with the mirror side facing rearwards with respect to the normal driving direction. Typically, the housing is connectable with the base shaft via an actuator, so that the pivoting movement of the housing whereby the supporting frame is folded in and folded out can be performed in a driven manner. The supporting frame usually further supports a cap, which encases the supporting frame, and partly surrounds the exterior vision element.

With other exterior vision units, it is possible, whether or not in combination with an exterior mirror, for an exterior display and/or camera lens to assume the positions mentioned. An exterior display and/or camera lens may then for instance be arranged in the exterior vision unit roughly in the same position as an exterior mirror, but may also be arranged in the exterior vision unit in other positions.

It is desired for the exterior vision unit of a vehicle to be made of compact construction, to minimize its contribution to the total air resistance of a vehicle. Digital exterior vision units such as exterior cameras and/or exterior displays, for instance, can be made of particularly compact arrangement, in consequence of which the adjusting instrument dictates the dimensions of an exterior vision unit to an increasing extent. A limiting factor in the miniaturization of the adjusting instrument, however, is that the adjusting instrument must continue to have sufficiently robust and force-resistant properties. For instance, the adjusting instrument normally comprises a forceful spring which continuously presses the housing down on the base for defining the drive position durably free of vibration and free of play. In addition, the adjusting instrument needs to be resistant to an impact such as a collision or manual operation.

The invention accordingly has for its object to furnish a compactly constructed adjusting instrument while preserving robust and force-resistant properties. To that end, the invention provides an adjusting instrument for an exterior vision unit for a vehicle, comprising a base shaft and a housing which surrounds the base shaft and which is pivotable around a longitudinal axis of the base shaft in an adjustment range, between at least a park position and a drive position. The adjusting instrument further comprises a driving gearwheel, which driving gearwheel comprises a (so-called) face provided with an outer toothing surrounding the base shaft, and a gearwheel body, with the face defining a face height within which a web part of the gearwheel body extends substantially in a transverse plane with respect to the base shaft between the base shaft and the face. Further, the adjusting instrument comprises a spring which surrounds the base shaft, which spring is supported on a support surface of the gearwheel body for exerting a spring force on the driving gearwheel along the longitudinal axis. The support surface lies recessed in axial direction with respect to the transverse plane in which the web part substantially extends, such that the spring extends through the transverse plane. Additionally or alternatively, the support surface is located recessed in axial direction with respect to the transverse plane in which the web part substantially extends, such that a center of the spring is located within the face height. The center may for instance be a center of gravity, mass center or geometric center of the spring. In particular, the center of the spring may at least substantially coincide with a center of the driving gearwheel, which provides for a particularly stable assembly.

By providing the spring recessed in the driving gearwheel, a dimension of the adjusting instrument in axial direction can be reduced, while the geometry of the spring can remain substantially unchanged. The spring can especially preserve sufficient length in axial direction so that the spring can be given a desired spring travel stroke with, in the case of a helical spring, a desired number of turns. The spring can thus be made of sufficiently forceful configuration, with the spring properties of the spring being largely preserved.

The face height indicates a dimensional range in which the face extends in axial direction. The face extends for instance in an axial range between a bottom plane at a lower side of the face and a top plane at an upper side of the face, allowing the face height to be defined between the bottom plane and the top plane. The toothing of the gearwheel may then cover the entire face height but this need not necessarily be so.

The support surface may for instance be located within the face height, as in the axial range between the top plane and the bottom plane. In particular, the support surface may be recessed with respect to the top plane, with the support surface being located closer to the bottom plane than to the top plane. More particularly, the support surface may be located recessed in axial direction with respect to the top plane to a point beyond half of the face height. The spring supported on the support surface then reaches through the top plane to a point beyond half of the face height.

The web part of the gearwheel body extends substantially transversely, i.e. in a plane transverse to the base shaft, for instance between a central run-through opening of the driving gearwheel and the face. In transverse direction, the support surface is then located between the central run-through opening and the face.

The spring may be provided in a recessed portion in the gearwheel body of the driving gearwheel, with a bottom of the recessed portion defining the support surface. An inward wall of the recessed portion, located on a side of the run-through opening, may for instance form a bearing face which surrounds the base shaft and provides a bearing between the driving gearwheel and the base shaft. From an outward wall of the recessed portion, located on a side of the face, the web part may issue.

Further, the gearwheel body may for instance be provided with at least a force transmission cam for cooperation with a cam ring of the adjusting instrument.

The support surface of the driving gearwheel, on which the spring is supported, is advantageously located outside the face height, for example below the face height. The spring, in that case, essentially reaches through the driving gearwheel, to a point beyond the axial dimensional range of the face height, for example, through both the top plane and the bottom plane. In this way, a particularly compact arrangement of the adjusting instrument is obtained.

The driving gearwheel may comprise a bearing face which surrounds the base shaft, with a height of the bearing face being, in axial direction, greater than the face height of the driving gearwheel. This provides for a stable alignment of the driving gearwheel around the base shaft. The bearing face is for instance formed by a side of the recessed portion located against the base shaft.

Further, the adjusting instrument advantageously comprises two or more cam rings surrounding the base shaft and which are each provided with at least one force transmission cam which can cooperate mutually, with the driving gearwheel and/or with the housing, wherein the two or more cam rings are positioned radially with respect to each other.

The support surface is preferably located between the base shaft and the cam rings.

Further, the adjusting instrument can comprise an electric motor coupled with the housing and having an output shaft, for pivoting of the housing around the longitudinal axis of the base shaft, with the output shaft of the electric motor extending transversely to the longitudinal axis.

A ratio between a diameter of the base shaft and a diameter of the driving gearwheel may for instance be between 0.15 and 0.5.

A ratio between a width of the housing and a height of the housing may for instance be between 0.15 and 0.5. The height of the housing is then for instance defined as the height along the longitudinal axis of the base shaft. The width of the housing is then for instance defined in a direction transverse to, and crossing, the longitudinal axis of the base shaft.

The invention further relates to an adjusting instrument for an exterior vision unit for a vehicle, comprising a base shaft; and a housing which surrounds the base shaft and which is pivotable around a longitudinal axis of the base shaft in an adjustment range, between at least a park position and a drive position; wherein the base shaft comprises a receiving provision for receiving a screw in the base shaft. The adjusting instrument may thus be connected with the vehicle by means of a screwed connection. The screwed connection comprises for instance only one single screw extending axially into the base shaft. In this way, the number of mounting operations is minimized and, moreover, mounting space is saved, enabling the adjusting instrument to be made of more compact design. The receiving provision may be formed by a cavity in the base shaft. Optionally, the inner wall of the base shaft is provided with an internal screw thread for cooperation with an external screw thread of the screw. It will be clear that the terms "screw" and "screwed connection" are understood to encompass bolts, pins and otherwise rod-shaped or equivalent fasteners and associated connections. In known adjusting instruments the base shaft is normally of hollow configuration, such that cabling, for example electric cabling for electric adjustment of a mirror plate supported by the supporting frame, can be passed through the hollow base shaft. The adjusting instrument is usually mounted on the base part of the vehicle with three screws which are fitted through three holes distributed along the circumference of a foot of the base shaft. This, on the one hand, provides an operationally reliable connection but, on the other hand, entails a large number of assembly operations and assembly parts.

Advantageously, the adjusting instrument, and in particular the base shaft, is free of the cabling for the electric adjustment of an exterior vision element, for example a mirror or camera, supported by the supporting frame. The cabling may for instance be guided outside the adjusting instrument, which allows a screwed connection to be effected through the base shaft. In this way, the adjusting instrument can be made of more compact arrangement. In particular, a diameter of the base shaft may be reduced, so that in a radial or width direction of the adjusting instrument a saving of space can be realized. The cabling may additionally comprise a data cabling for effecting a data connection between for instance an exterior camera supported by the supporting frame and a display provided in an interior of the vehicle. In many cases, it is undesirable to guide the data cabling through the base shaft because of the sharp bends thereby imposed on the cabling, which can lead to signal disturbance and signal loss. To obviate this, the data cabling may then be arranged alongside the adjusting instrument as rectilinearly as possible.

The adjusting instrument may comprise one or more positioning cams and/or positioning recesses for cooperation with one or more complementary positioning recesses and/or positioning cams of a base part of the vehicle on which the adjusting instrument can be mounted, for positioning the adjusting instrument with respect to the base part. The positioning cams ensure in particular that the adjusting instrument is fixed at least in lateral and rotational direction with respect to the base part on which the adjusting instrument is mounted.

In particular, the adjusting instrument comprises at least three positioning cams and/or positioning recesses. More particularly, the adjusting instrument comprises a cylindrical positioning cam or positioning recess, a positioning cam and/or positioning recess elongated in a radial direction, and a positioning cam or positioning recess elongated in a circumferential direction.

The invention further relates to an adjusting instrument for an exterior vision unit for a vehicle, comprising a base shaft which, in mounted condition, extends from a base along a longitudinal axis of the base shaft up to a free end; and a housing which, at least substantially, surrounds the base shaft and which is pivotable around the longitudinal axis of the base shaft in an adjustment range, between at least a park position and a drive position; wherein the housing is bearing-mounted with the base shaft at the free end of the base shaft.

In particular, the base shaft, in mounted condition, extends from a base along the longitudinal axis of the base shaft up to an open end, with a bearing part of the housing reaching through the open end into the hollow base shaft so as to bearing-mount the housing around the base shaft on an internal side of the base shaft.

The free end of the base shaft may be covered by a part of the housing, for example by a lid part of the housing. The base shaft and the spring are thereby, at least largely, enclosed by the housing, whereby a compact and simply mountable adjusting instrument is obtained. Moreover, internal parts of the adjusting instrument are screened off by the housing from the surroundings outside the adjusting instrument.

The invention further relates to an exterior vision unit for a vehicle, comprising an adjusting instrument and a mirror, display and/or camera coupled with the housing.

It will be understood that each of the above aspects, features and options can be combined. It will further be understood that each of the features described with regard to one of the aspects of the invention equally applies to every other aspect of the invention. It will also be clear that all aspects, features and options described with regard to the adjusting instrument equally apply to the exterior vision unit.

The invention will be further elucidated on the basis of an exemplary embodiment of an adjusting instrument which is shown in the drawings. In the drawings.

Figure 3A:
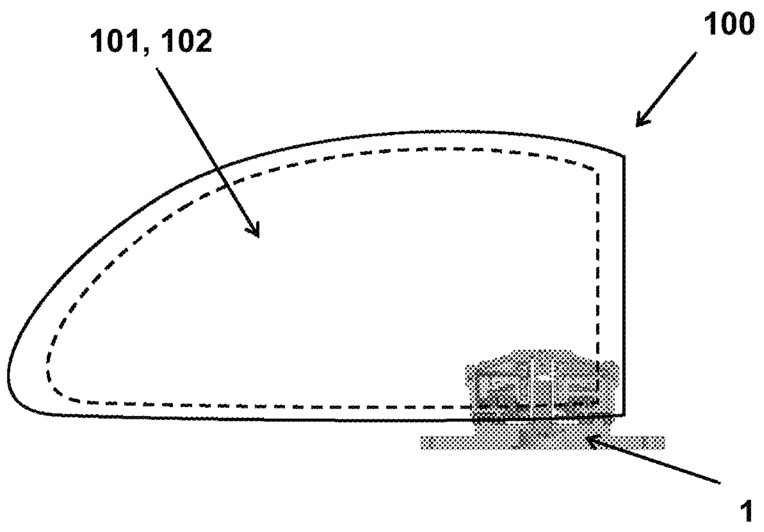

FIG. 3A shows an exterior vision unit 100 for a vehicle, comprising an adjusting instrument 1 as described herein. The exterior vision unit 100 includes a mirror 101 or a display 102, coupled with the housing 3 of the adjusting instrument 1.

Figure 3B:
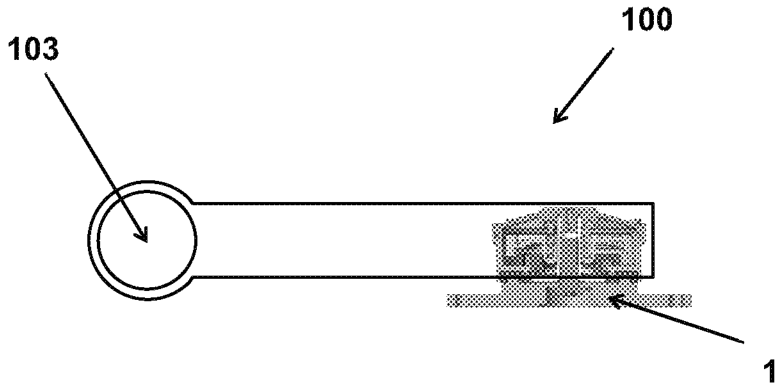

FIG. 3B shows an exterior vision unit 100 for a vehicle, comprising an adjusting instrument 1 as described herein. The exterior vision unit 100 includes a camera 103 coupled with the housing 3 of the adjusting instrument 1.

The figures are shown only by way of exemplary embodiment and should not in any way be regarded as limiting.

Figure 1:
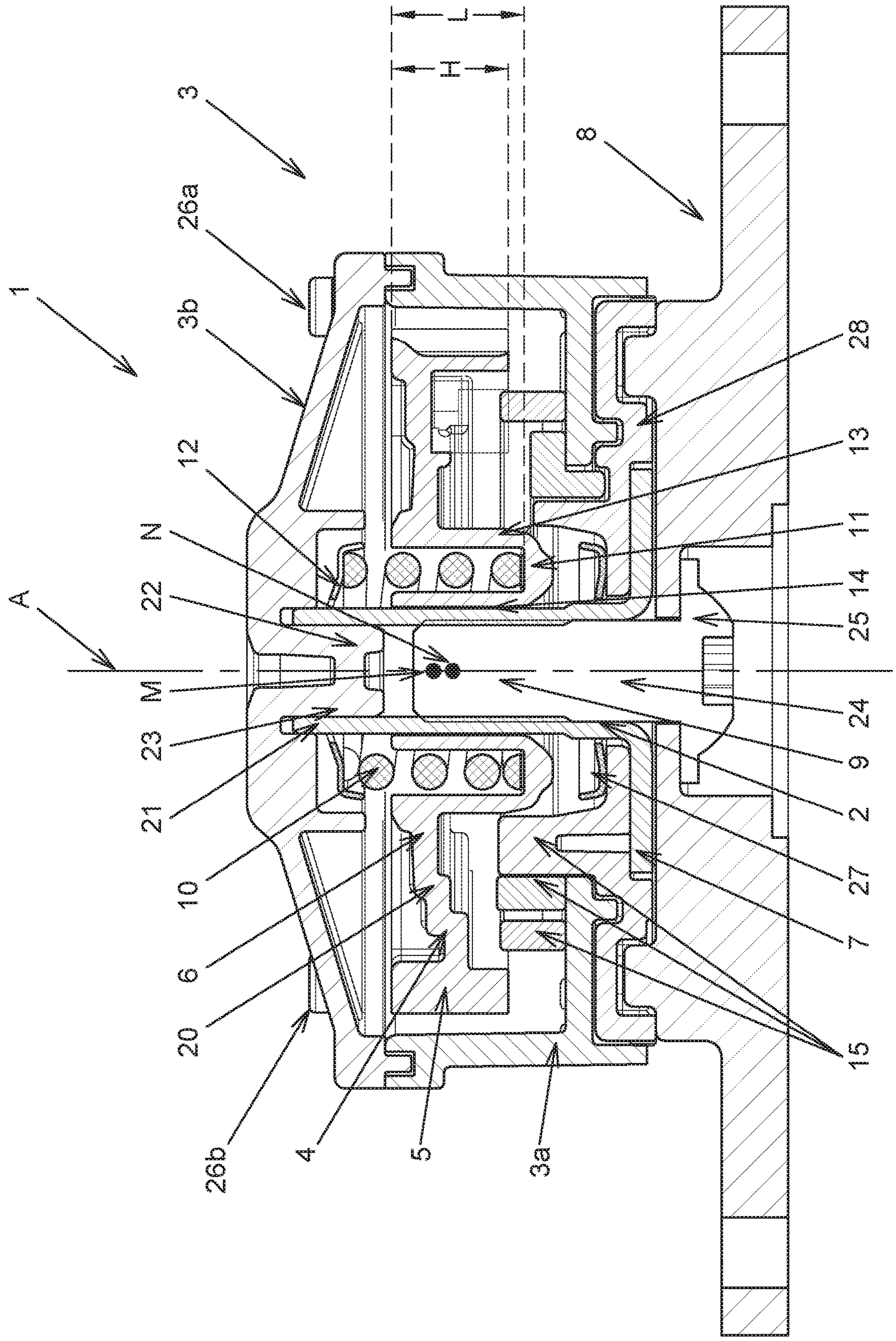
FIG. 1 shows a schematic cross section of the adjusting instrument.
Figure 2:
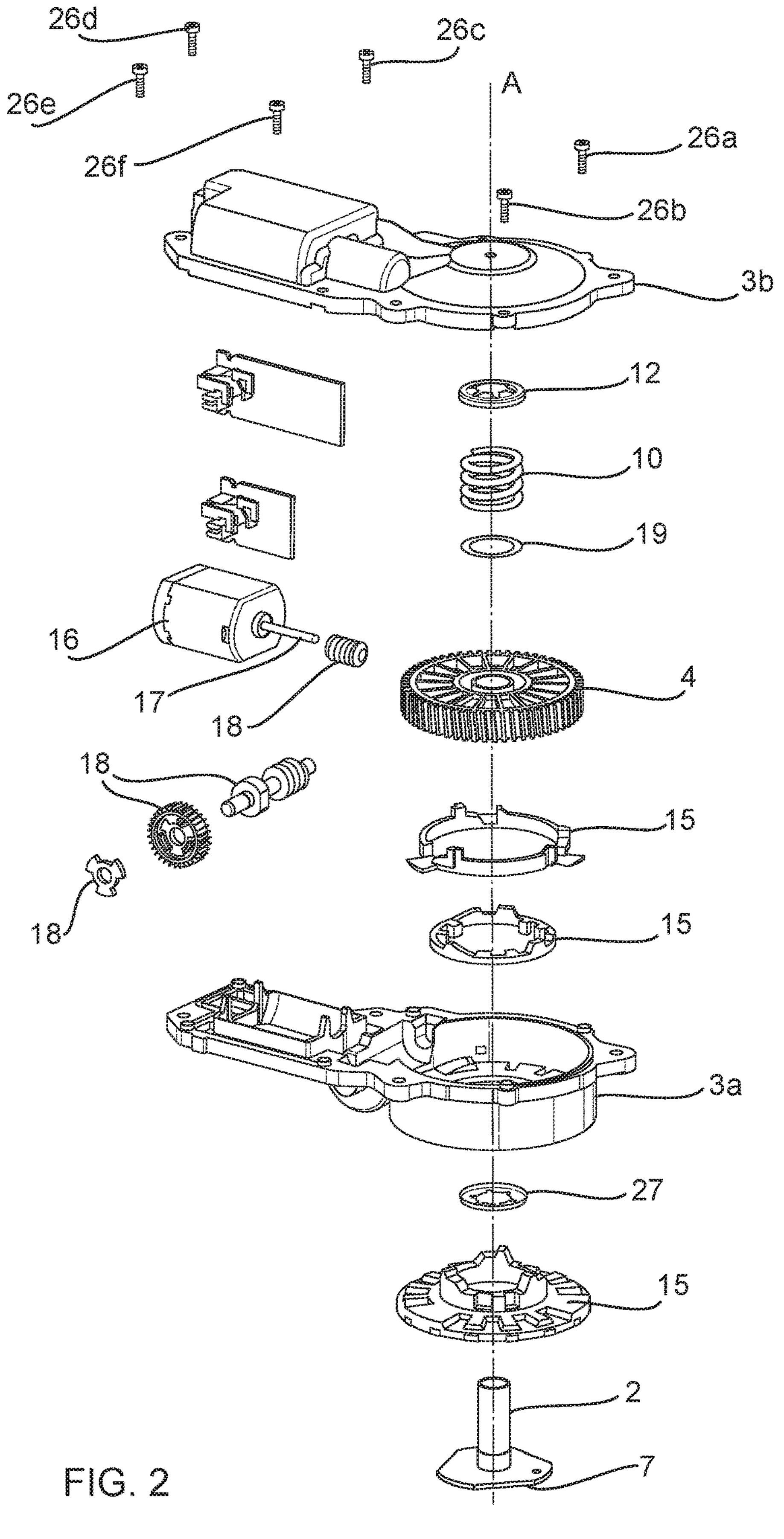
FIG. 2 shows a schematic perspective exploded view of an adjusting instrument.

FIG. 1 and FIG. 2 show an adjusting instrument 1 for an exterior vision unit of a vehicle. The adjusting instrument 1 comprises a base shaft 2 which extends along a longitudinal axis A, and a housing 3. The housing 3 is made up of at least a first and second housing part 3*a* and 3*b* which are connected with each other, for instance with the aid of screws 26*a*-26*f*. The housing 3 is pivotable around the longitudinal axis A of the base shaft 2 in an adjustment range, between at least a park position and a drive position. Optionally, it is possible to pivot yet further from the drive position to an overfold position where the supporting frame is situated substantially alongside the vehicle, in the case of an exterior mirror unit with the mirror side facing away from the vehicle. The housing 1 is mounted on a base part 8 of for instance a body of a motor vehicle, for example a car. The base shaft 2 is here implemented as a hollow shaft which extends from a foot 7 of the base shaft 2 along the longitudinal axis A up to a free open end 21. In mounted condition, the base shaft extends at least substantially transversely to a supporting surface of the base part 8. The second housing part 3*b* forms a lid of the adjusting instrument 1, which covers the free end 21 of the base shaft 2. The adjusting instrument 1 is thus largely enclosed by the housing 3. The spring 10 is for instance located wholly within the housing 3. Also, the base shaft 2 extends within the housing 3, from the foot 7 to the free end 21.

Further, the second housing part 3*b* comprises a bearing part 22 which reaches through the open end 21 of the base shaft 2 into the interior of the base shaft 2, with the bearing part 22 forming a bearing face 23 which bears against an inner wall of the hollow base shaft 2. This bearing of the housing 3 within the base shaft 2 is particularly stable, and ensures a particularly accurate alignment of the housing 3 around the base shaft 2.

The adjusting instrument 1 further comprises a driving gearwheel 4 which is received within the housing 3, the driving gearwheel 4 comprising a so-called face 5 and a gearwheel body 20. The face 5 is provided with an outer toothing 6 which surrounds the base shaft 2, the face 5 defining a face height H within which a web part 6 of the gearwheel body 20 extends substantially in a transverse plane with respect to the base shaft, between the base shaft 2 and the face 5. The driving gearwheel 4 comprises a central opening 9 through which the base shaft 2 is arranged.

Further, the adjusting instrument 1 comprises a spring 10, here implemented as a helical spring, which surrounds the base shaft 2. The spring 10 is supported on a support surface 11 of the gearwheel body 20 and exerts a spring force on the driving gearwheel along the longitudinal axis A. The spring 10, in mounted condition of the adjusting instrument, is compressed between on one side the support surface 11 and on the other side an upper fastening ring 12, here implemented as a set ring. The spring 10 is brought into a compressed condition between the support surface 11 and the upper fastening ring 12 by coupling the first housing part 3*a* and the second housing part 3*b* to each other with the aid of the screws 26*a*-26*f*.

The adjusting instrument 1 can be mounted as a whole on the base part 8 by a single screw 24 which cooperates with a receiving provision of the hollow base shaft 2. The receiving provision is here formed by the base shaft 2 itself. The screw 24 is fitted axially in the hollow base shaft 2, such that the longitudinal direction of the screw 24 corresponds to the direction of the longitudinal axis A. The adjusting instrument 1 can be mounted on the base part 8 in a simple manner by inserting the screw 24 from below through an opening in the base part 8 and into the hollow base shaft 2, whereby the screw 24, by an external thread thereof, engages an internal thread of the base shaft 2, so that upon tightening of the screw 24, the base shaft 2 is pulled against the base part 8. A lower fastening ring 27, here a set ring, is provided for coupling of the base shaft 2 with a base ring 28 of the adjusting instrument 1, such that the base ring 28, by tightening of the screw 24, is clamped against the base part 8 of the vehicle. In mounted condition, the screwhead 25 of the screw 24 then abuts, on a lower side of the adjusting instrument 1, against the base part 8. The base ring 28 is rotation-locked with the base shaft 2, here by means of the triangle-shaped foot 7 of the base shaft 2 being received in a complementary receiving provision in the base ring 28.

The base ring 28 is, on a side facing the base part 8, further provided with three positioning recesses which cooperate with three complementary positioning cams of the base part 8. The positioning cams and positioning recesses are provided for the positioning and fixing of the adjusting instrument 1 with respect to the base part 8. The positioning cams and positioning recesses provide in particular for the fixation of the adjusting instrument at least in lateral and rotational direction with respect to the base part 8 on which the adjusting instrument 1 is mounted. The base ring 28 is manufactured of a plastics material, so that the positioning recesses in the base ring 28 can be pulled over the respective complementary positioning cams of the base part 8, with the plastics material of the base ring 28 being able to deform. In fact, the base part 8 is normally manufactured of a sintered material having a relatively great hardness. The base ring 28 manufactured of plastic can thus accommodate dimensional tolerances between the positioning cams and positioning recesses. In particular, the base ring 28 comprises a cylindrical positioning recess, a positioning recess elongated in a radial direction, and a positioning recess elongated in a circumferential direction; and the base part 8 complementarily comprises a cylindrical positioning cam, a positioning cam elongated in a radial direction, and a positioning cam elongated in a circumferential direction.

The support surface 11 is located recessed in axial direction, along the longitudinal axis A, with respect to the transverse plane in which the web part 6 of the gearwheel body 20 substantially extends. A center M of the spring 10 is located within the face height H. The center M in this case is a geometric center of the spring 10 in mounted condition. The center M of the spring 10 lies, in particular, at least substantially in the same location as a center N of the driving gearwheel 4. The spring 10 here reaches through the transverse plane in which the web part 6 substantially extends. The support surface 11, in the configuration shown, lies below the transverse plane. More specifically, the support surface 11 lies outside the face height H, so that the spring 10 reaches effectively through the driving gearwheel 4, beyond the face height H, whereby a compact and stable adjusting instrument 1 is obtained. In particular, in this manner, a considerable dimensional reduction of the adjusting instrument 1 in axial direction can be realized, vis-à-vis conventional adjusting instruments where the spring 10 is not arranged recessed in the driving gearwheel 4 but is supported on top of the web part 6 of the driving gearwheel. Moreover, the axial dimension reduction is realized while the geometry of the spring 10 can remain substantially unchanged with respect to the conventional adjusting instruments, and so can be made of a sufficiently forceful design.

The driving gearwheel 4 is provided with a recessed portion 13 in which the spring 10 is received, the recessed portion 13 at a bottom side thereof defining the support surface 11. Between the spring 10 and the support surface 11, additionally a bearing ring 19 is arranged, for facilitating the rotation of the driving gearwheel 4 around the base shaft 2 relative to the spring 10. A side of the recessed portion 13 that abuts on the base shaft 2 forms a bearing face 14. The bearing face 14 surrounds the base shaft 2, and has a bearing height L which is greater than the face height H of the face 5, which provides for a stable guiding and aligning of the driving gearwheel 4 around the base shaft 2.

The adjusting instrument 1 further comprises two or more cam rings 15 which surround the base shaft 2 and which are each provided with at least one force transmission cam which can cooperate mutually, with the driving gearwheel 4 and/or with the housing 3. The cam rings 15 are positioned radially with respect to each other, so that a further saving of space can be realized. More particularly, the cam rings 15 and the base shaft 2 define a mutual distance, with the support surface 11 located between the cam rings 15 and the base shaft 2.

The adjusting instrument 1 further comprises an electric motor 16, coupled with the housing 3 and having an output shaft 17, for pivoting the housing 3 around the longitudinal axis A of the base shaft 2. To minimize a height of the housing, the electric motor 16 is coupled with the housing 3 in a lying configuration, with the output shaft 17 of the electric motor 16 extending transversely to the longitudinal axis A. The output shaft 17 is connected with the driving gearwheel 4 via a driveline 18.

The invention is not limited to the exemplary embodiments represented here. Many variations will be clear to a person skilled in the art and are understood to be within the scope of the invention as set forth in the appended claims.

The invention claimed is:

1. An adjusting instrument for an exterior vision unit for a vehicle, comprising:
- a base shaft;
- a housing which surrounds the base shaft and which is pivotable around a longitudinal axis of the base shaft in an adjustment range, between at least a park position and a drive position;
- a driving gearwheel comprising a face provided with an outer toothing which surrounds the base shaft, and a gearwheel body, wherein the face defines a face height that is entirely covered by the outer toothing, and wherein a web part of the gearwheel body extends within the face height substantially in a transverse plane with respect to the base shaft, between the base shaft and the face; and
- a spring which surrounds the base shaft, the spring being supported on a support surface of the gearwheel body for exerting a spring force on the driving gearwheel along the longitudinal axis,
- wherein the support surface is located recessed in axial direction with respect to the transverse plane in which the web part substantially extends, such that the spring reaches through the transverse plane.

2. The adjusting instrument according to claim 1, wherein the support surface is located outside the face height, and the spring reaches through the driving gearwheel.

3. The adjusting instrument according to claim 1, wherein the driving gearwheel comprises a bearing face which surrounds the base shaft, wherein a height of the bearing face, in axial direction, is greater than the face height of the driving gearwheel.

4. The adjusting instrument according to claim 1, further comprising two or more cam rings surrounding the base shaft, and which are each provided with at least one force transmission cam that can cooperate mutually, with at least one of the driving gearwheel or with the housing, wherein the two or more cam rings are positioned radially with respect to each other.

5. The adjusting instrument according to claim 4, wherein the support surface is located between the base shaft and the cam rings.

6. The adjusting instrument according to claim 1, further comprising an electric motor coupled with the housing and having an output shaft, for pivoting the housing around the longitudinal axis of the base shaft, with the output shaft of the electric motor extending transversely to the longitudinal axis.

7. The adjusting instrument according to claim 1, wherein a ratio between a diameter of the base shaft and a diameter of the driving gearwheel is between 0.15 and 0.5.

8. The adjusting instrument according to claim 1, wherein a ratio between a width of the housing and a height of the housing is between 0.15 and 0.5.

9. The adjusting instrument according to claim 1, wherein the base shaft comprises a receiving provision for receiving a screw in the base shaft.

10. The adjusting instrument according to claim 1, comprising one or more positioning cams or positioning recesses for cooperation with one or more complementary positioning recesses or positioning cams of a base part of the vehicle on which the adjusting instrument can be mounted, for positioning the adjusting instrument with respect to the base part.

11. The adjusting instrument according to claim 1, wherein the base shaft, in mounted condition, extends from a base part along a longitudinal axis of the base shaft up to a free end, wherein the housing is bearing-mounted around the base shaft at the free end of the base shaft.

12. The adjusting instrument according to claim 11, wherein the free end of the base shaft is an open end, wherein a bearing part of the housing reaches through the open end into the hollow base shaft so as to bearing-mount the housing with the base shaft on an internal side of the base shaft.

13. The adjusting instrument according to claim 11, wherein the free end of the base shaft is covered by a part of the housing.

14. An exterior vision unit for a vehicle, comprising an adjusting instrument according to claim 1, and at least one of a mirror, display or camera coupled with the housing.

15. An adjusting instrument for an exterior vision unit for a vehicle, comprising:

a base shaft a housing which surrounds the base shaft and which is pivotable around a longitudinal axis of the base shaft in an adjustment range, between at least a park position and a drive position;

a driving gearwheel comprising a face provided with an outer toothing which surrounds the base shaft, and a gearwheel body, wherein the face defines a face height that is entirely covered by the outer toothing, and wherein a web part of the gearwheel body extends within the face height substantially in a transverse plane with respect to the base shaft, between the base shaft and the face;

a spring which surrounds the base shaft, the spring being supported on a support surface of the gearwheel body for exerting a spring force on the driving gearwheel along the longitudinal axis, wherein the support surface is located recessed in axial direction with respect to the transverse plane in which the web part substantially extends, such that a center of the spring is located within the face height.

16. The adjustment instrument according to claim 15, wherein the support surface is located outside the face height, and the spring reaches through the driving gearwheel.

17. The adjusting instrument according to claim 15, wherein the driving gearwheel comprises a bearing face which surrounds the base shaft, wherein a height of the bearing face, in axial direction, is greater than the face height of the driving gearwheel.

18. The adjusting instrument according to claim 15, further comprising two or more cam rings surrounding the base shaft, and which are each provided with at least one force transmission cam that can cooperate mutually, with at least one of the driving gearwheel or with the housing, wherein the two or more cam rings are positioned radially with respect to each other.

19. The adjusting instrument according to claim 18, wherein the support surface is located between the base shaft and the cam rings.

20. The adjusting instrument according to claim 15, further comprising an electric motor coupled with the housing and having an output shaft, for pivoting the housing around the longitudinal axis of the base shaft, with the output shaft of the electric motor extending transversely to the longitudinal axis.

* * * * *